INVENTORS
WILLIAM H. BROWNING
EDWARD D. PADGETT

BY Harry M. Saragovitz,
Edward J. Kelly & Herbert Berl
ATTORNEYS

United States Patent Office 3,345,520
Patented Oct. 3, 1967

3,345,520
GYRO-CHRONOMETER SYSTEM FOR GENERATING PRECISE TIME BASE ELECTRICAL SIGNALS AND MEANS RESPONSIVE THERETO FOR SEQUENCING EVENTS
William H. Browning, Mountain Lakes, and Edward D. Padgett, Morristown, N.J., assignors to the United States of America as represented by the Secretary of the Army
Filed Sept. 8, 1964, Ser. No. 395,103
2 Claims. (Cl. 307—88.5)

ABSTRACT OF THE DISCLOSURE

A gyro-chronometer system for generating precise time base electrical signals consisting of a gyroscope driven generator for generating electrical pulses during each revolution of the spin mechanism which are detected by an electromagnetic pick-up placed near the periphery of the gimbaled device and electronic feedback means coupling the output of the generator to torquer means mounted on the gimbal for correcting variations in the rotational velocity of the gyroscope, and means coupling precise time base signals thus generated to computer means for sequencing events.

---

The invention described herein may be manufactured and used by or for the Government for governmental purposes, without the payment to us of any royalty thereon.

This invention relates to electromagnetic timers and more particularly to a gyro-chronometer and system, the time base of which is generated by an inertial device such as a gyroscope comprising an integral part of the timer and which provides high rotational velocities having an accuracy of ±0.10% over a wide range of temperature, shock and vibration which is not obtainable in other rotating devices operating under such conditions.

An object of the invention is an electromagnetic timer utilizing an inertial device for generating a time base of great accuracy over a wide range of temperatures and unaffected by shock and vibration.

Another object of the invention is an electromagnetic chronometer capable of maintaining a high degree of accuracy in any geographical or space location as related to a fixed inertial reference.

A further object of the invention is an electromagnetic timer utilizing an inertial means for establishing a time base for sequencing events in earth to earth missiles, space probes or platforms, interplanetary vehicles or events which require great accuracy in timing.

Figure 1:
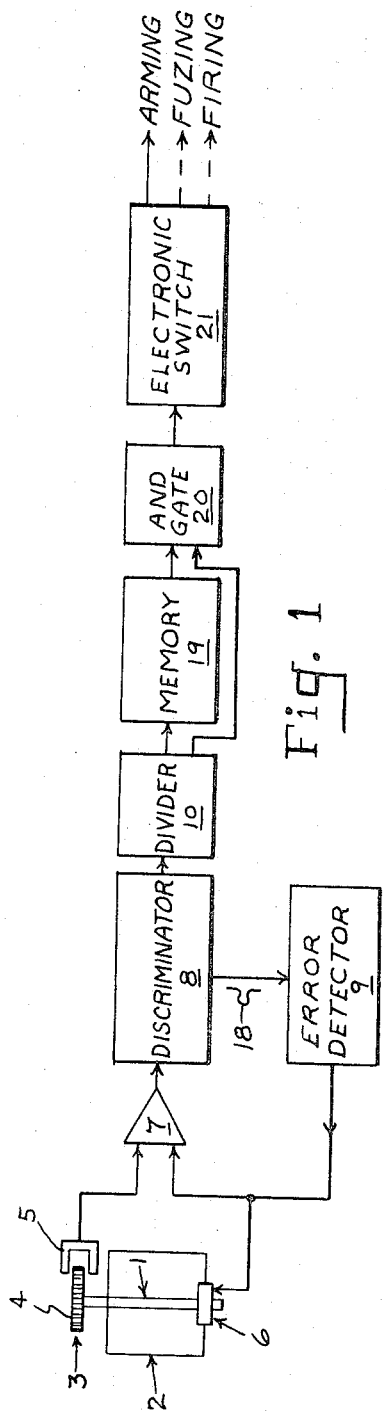
Figure 2:
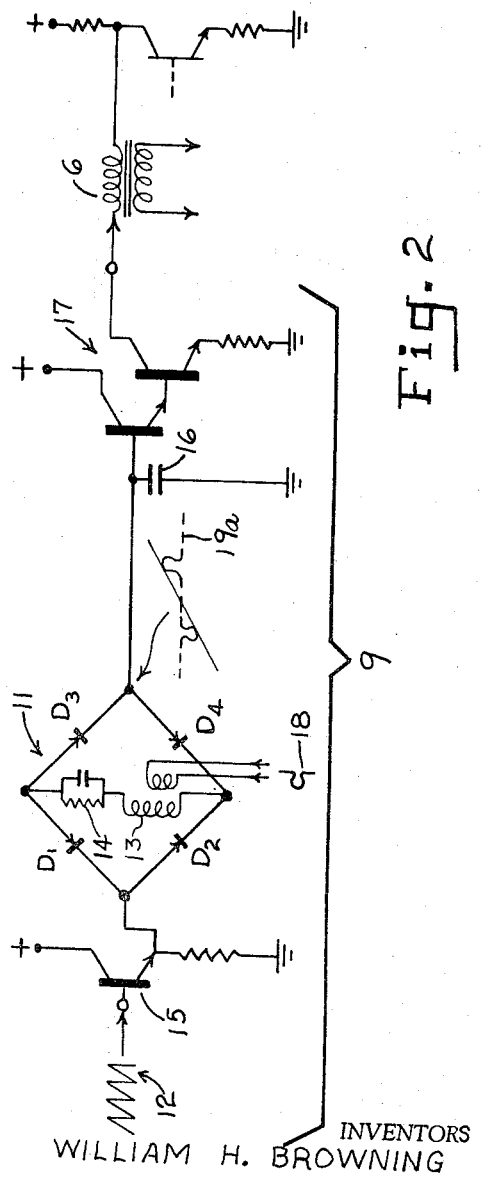

The specific nature of the invention as well as other objects and advantages thereof will clearly appear from the following description and accompanying drawings in which:

FIGURE 1 is a block diagram of the invention; and
FIGURE 2 is a schematic circuit diagram of the error detector.

Referring to FIGURE 1 of the drawings, 1 indicates the shaft of the rotor of a gyroscope and 2 the gyro gimbal. Mounted on one end of shaft 1 is an electromagnetic generator 3 in the form of a disc having spaced teeth 4 formed in its periphery. An inductive pick-up device 5 is mounted adjacent the teeth 4 on the gimbal to pick up electromagnetic signals forming the basic time. A gimbal torquer 6 is also mounted on gimbal 2. In operation the electromagnetic generator 3 rotates when the rotor is activated by electric energy. The rotating generator 3 causes an electromagnetic wave train of pulses to be induced in the inductive pick-up device 5. The shape and number of pulses created are determined by the size, width, depth and nature of the indentations forming teeth 4. The resultant electrical wave train consists of triangular or rectangular pulses occurring periodically at a given rate or frequency. These pulses are applied to an amplifier 7 for amplification and shaping and then to dividing and counting circuits for further processing. Thereafter the circuitry of the system generates at precise preset times a plurality of electrical signals for sequencing, safing, arming and firing systems used in missiles and space vehicles or for chronographic, navigational or computer purposes in such missiles and space vehicles. The discriminator 8 which is an electronic circuit whose function is to eliminate or discriminate against spurious signal and interference has its input coupled to the output of amplifier 7 and its output coupled to divider 10. The discriminator 8 also has its output coupled to error detector 9 which is essentially a voltage comparator used in a feedback circuit, one embodiment of which is shown in FIGURE 2. If desired, the input of the error detector may be coupled to the output of the amplifier 7 or divider 10. Divider 10 divides the basic timing signal into submultiples of the basic timing signal generated by generator 3.

In the feedback system illustrated in FIGURE 2, if the timing signal generated by the electromagnetic generator 3 is in error, that is, if the frequency changes, an error signal voltage or current is developed in the error detector 9 and fed back to the torquer 6 and amplifier 7 to change the speed of the electromagnetic generator and to stabilize the operating points of amplifier 7. The error detector 9 comprises a bridge circuit 11 having a silicon diode in each leg. A sawtooth timing voltage 12 is applied to one terminal of the first input of the bridge through transistor amplifier 15. A sampling pulse signal 18, generator wave train pulses, from discriminator 8 is applied to the second input of the bridge through a pulse transformer 13 in series with an RC circuit 14. The other terminal of the first input is connected to a capacitor 16 which is returned to the common circuit and to the emitter-follower amplifier 17. The output of the emitter-follower amplifier 17 is coupled to the torquer 6 mounted on gimbal 2. If the sampling pulse 18 coincides with the intersection of the ramp of the sawtooth voltage and reference axis 19a no error output is developed. If the pulse rate changes and a pulse appears above the reference axis an error signal develops and capacitor 16 charges positively through the pulse transformer windings and diodes $D_2$ and $D_3$. If the pulse appears below the reference axis the capacitor charges negatively through the pulse transformer windings and diodes $D_1$ and $D_4$. This error signal which is proportional to the error in the frequency or time of the pulse train generated by the electromagnetic generator is amplified by the emitter-follower amplifier 17 and fed to the amplifier 7 and also to the torquer 6 mounted on gimbal 2 to correct and maintain a constant generator speed and therefore a constant output frequency.

In one application, generator 3 produces a basic precise timing signal or pulses of 1000 c.p.s. which is coupled to divider 10 through discriminator 8. Divider 10 scales down the frequency of this signal to 10 cycles per second, one cycle every tenth second, which is adequate for the system in regard to controlling the arming means of an ordnance fuze in, for example, a missile. These submultiple pulses of the basic timing signal are coupled to memory means 19 and AND gate 20. The memory means 19 consists of a solid state flip-flop multivibrator which is triggered by the submultiple pulses, and a ten stage ring counter consisting of ten pnpn transistors coupled to the flip-flop. The submultiple pulses are also applied to the base elements of the ten pnpn semiconductors comprising the ring counter. The output of each stage of this ten stage ring counter is connected to a respective tap of a ten tap rotary switch so that the output pulses or signals of the ring counter may be selected in increments of one-tenth second. For example if it were desired to activate the arming means six-tenths second after time zero, the rotor arm of the switch would be positioned on the sixth tap of the rotary switch. Briefly, the flip-flop which with a coincident time base pulse turns off and on the proper pnpn unit in the ten stage ring counter which is activated by the pulses derived from divider 10. As each said pulse derived from divider 10 is applied to the base electrodes of the pnpn semiconductors of the ring counter in coincidence with the output pulses from the triggered flip-flop, each stage in the ring counter is turned off and on at the appropriate time. In effect, then, this ring counter steps along in 0.1 second increments. The selected output pulse of the ring counter of memory 19 for instance in the example above is applied to AND gate 20 which then functions to activate electronic switch 21, a silicon controlled rectifier having the arming means of the fuze as its load. It is to be noted that pulses from divider 10 are directly applied to AND gate 20 which functions when said selected output pulse is coincident with one of the pulses derived from divider 10 and directly applied to the AND gate. Thus it can be seen that the arming means has been programmed in accordance with an electrical signal generated at a precise, preset time. Although the system described above considered but one output signal, it is to be noted a multiplicity of output signals may be obtained by additional dividers, memory means, gates and electronic switches so that the system includes separate precise, preset timed signals for arming, fuzing, firing or navigational purposes.

Although a specific embodiment of this invention has been illustrated and described, it will be understood that this is but illustrative and that various modifications may be made therein without departing from the spirit of this invention and the scope of the appended claims.

We claim:

1. A time base generator comprising, a gyroscope, a reactor mounted on the gimbal means of said gyroscope, an electromagnetic generator for generating electrical pulses mounted on said gyroscope for rotation therewith, inductive pick-up means for detecting said pulses, an electronic amplifier having its input coupled to said inductive pick-up for amplifying and shaping said pulses and its output coupled to feedback means, the output of said feedback means coupled to said reactor, said feedback means transmitting an error signal due to deviations in rotational velocity of said gyroscope to said reactor to maintain the rotational velocity of said gyroscope constant and therefore the frequency of said electromagnetic pulse generator.

2. An electromagnetic timer system comprising, a gyroscope, a reactor mounted on the gimbal of said gyroscope, an electromagnetic generator mounted on said gyroscope for rotation therewith for generating a series of discrete electrical pulses forming a time base, inductive pick-up means coupled to said electromagnetic generator for detecting said pulses, an electronic amplifier having its input coupled to said inductive pick-up for amplifying and shaping said pulses, discriminator means coupling the output of said amplifier to an electronic error detector means responsive to variations in frequency of said pulses forming the time base and generating a corrective electrical signal, the output of said electronic error detector coupled to said reactor whereby said corrective electrical signal is applied to said reactor to correct the rotational velocity of the gyroscope, said last mentioned output also coupled to the input of said amplifier to stabilize the operating points of said amplifier, and an electronic computer means coupled to the output of said discriminator means, said computer means operating to select submultiples of the generated electrical time base and applying said submultiples in the form of electrical signals in a predetermined sequence to utilization circuits.

References Cited

UNITED STATES PATENTS

| | | | |
|---|---|---|---|
| 2,887,636 | 5/1959 | La Hue et al. | 74—5.6 X |
| 3,189,881 | 6/1965 | Reinhart | 340—206 |
| 3,259,822 | 7/1966 | Burmeister et al. | 318—230 |
| 3,301,071 | 1/1967 | Shalloway | 74—5.6 |
| 3,301,072 | 1/1967 | Simons et al. | 74—5.6 |

ARTHUR GAUSS, *Primary Examiner.*

J. JORDAN, *Assistant Examiner.*